(12) United States Patent
Shigeta et al.

(10) Patent No.: US 9,465,433 B2
(45) Date of Patent: Oct. 11, 2016

(54) INFORMATION PROCESSING DEVICE, METHOD AND PROGRAM

(75) Inventors: Osamu Shigeta, Tokyo (JP); Takuro Noda, Tokyo (JP)

(73) Assignee: SONY CORPORATION, Tokyo (JP)

(*) Notice: Subject to any disclaimer, the term of this patent is extended or adjusted under 35 U.S.C. 154(b) by 383 days.

(21) Appl. No.: 13/014,953

(22) Filed: Jan. 27, 2011

(65) Prior Publication Data

US 2011/0215995 A1 Sep. 8, 2011

(30) Foreign Application Priority Data

Mar. 5, 2010 (JP) ................................ 2010-049477

(51) Int. Cl.
G06F 3/0346 (2013.01)
H04N 5/228 (2006.01)
G06F 3/01 (2006.01)

(52) U.S. Cl.
CPC ...................................... *G06F 3/01* (2013.01)

(58) Field of Classification Search
CPC .......... G09G 5/00; G06F 3/01; G06F 3/011; G06F 3/012; G06F 3/013; G06F 3/014; G06F 3/015; G06F 3/016; G06F 3/017; G06F 3/0321; G06F 3/0325; G06F 3/0346; G06F 3/0425; G06F 3/0426; G06F 3/0428; H04N 5/228
USPC ......................................... 345/156; 348/497
See application file for complete search history.

(56) References Cited

U.S. PATENT DOCUMENTS

| | | | | |
|---|---|---|---|---|
| 5,852,749 A * | 12/1998 | Konno et al. | .................. | 396/55 |
| 7,662,047 B2 * | 2/2010 | Ueshima et al. | ............ | 473/199 |
| 7,903,084 B2 * | 3/2011 | Marvit et al. | ................. | 345/156 |
| 2007/0176906 A1 * | 8/2007 | Warren | ......................... | 345/173 |
| 2007/0291155 A1 * | 12/2007 | Kawaguchi et al. | .... | 348/333.12 |
| 2008/0107307 A1 * | 5/2008 | Altherr | ......................... | 382/107 |
| 2008/0144933 A1 * | 6/2008 | Or et al. | ....................... | 382/173 |
| 2009/0051648 A1 * | 2/2009 | Shamaie et al. | ............. | 345/156 |
| 2009/0146962 A1 * | 6/2009 | Ahonen et al. | ............... | 345/173 |
| 2009/0278820 A1 * | 11/2009 | Fourquin et al. | ............ | 345/184 |
| 2009/0303204 A1 * | 12/2009 | Nasiri et al. | .................. | 345/184 |
| 2009/0322695 A1 * | 12/2009 | Cho et al. | ...................... | 345/173 |
| 2010/0085216 A1 * | 4/2010 | Ms | ................................. | 341/20 |
| 2010/0157162 A1 * | 6/2010 | Oshikiri et al. | ............. | 348/699 |
| 2010/0208121 A1 * | 8/2010 | Kato et al. | ............... | 348/333.07 |

(Continued)

FOREIGN PATENT DOCUMENTS

JP 2009-75685 4/2009

OTHER PUBLICATIONS

U.S. Appl. No. 13/015,120, filed Jan. 27, 2011, Shigeta, et al.

*Primary Examiner* — Temesgh Ghebretinsae
*Assistant Examiner* — Paras D Karki
(74) *Attorney, Agent, or Firm* — Oblon, McClelland, Maier & Neustadt, L.L.P

(57) ABSTRACT

An information processing device includes a capture section capturing an image of an object, an acquisition section acquiring the image captured by the capture section, a calculation section calculating vibration information on the basis of the image acquired by the acquisition section, a determination section determining a vibration command on the basis of the vibration information calculated by the calculation section, and a control section executing predetermined processing on the basis of the vibration command determined by the determination section.

14 Claims, 8 Drawing Sheets

(56) References Cited

U.S. PATENT DOCUMENTS

2010/0281437 A1* 11/2010 Stone-Perez ............ A63F 13/06
                                                    715/863
2011/0053641 A1* 3/2011 Lee ...................... G06F 1/1626
                                                    455/556.1
2011/0063458 A1* 3/2011 Washisu et al. ........... 348/208.2
2011/0157379 A1* 6/2011 Kimura ..................... 348/208.2

* cited by examiner

INFORMATION PROCESSING DEVICE, METHOD AND PROGRAM

BACKGROUND OF THE INVENTION

1. Field of the Invention

The present invention relates to an information processing device, method and program, and in particular, to an information processing device, method and program configured to facilitate secure input of a command.

2. Description of the Related Art

Input to a personal computer is usually carried out by using a keyboard or mouse. That is, when a user inputs a predetermined command, the user performs an operation such as inputting a predetermined character by using the keyboard or clicking a predetermined icon by using the mouse.

When doing this, a desk, a table or the like is necessary for placing the keyboard or the mouse. To solve the problem, it has been proposed that a personal computer be equipped with a camera to capture an image of a hand of the user, recognize a gesture that the user performs, and carry out processing in accordance with the gesture (for example, Japanese Unexamined Patent Application Publication No. 2009-75685).

SUMMARY OF THE INVENTION

However, when a gesture is recognized from an image captured by the camera, there is a chance of the gesture being falsely recognized. Consequently, it may take time to input a command or a command may not be input easily and securely.

The present invention addresses the above-identified problems in order to facilitate secure input of a command.

An information processing device of an embodiment of the present invention includes capture means configured to capture an image of an object, acquisition means configured to acquire the image captured by the capture means, calculation means configured to calculate vibration information on the basis of the image acquired by the acquisition means, determination means configured to determine a vibration command on the basis of the vibration information calculated by the calculation means, and control means configured to execute predetermined processing on the basis of the vibration command determined by the determination means.

When the vibration command is generated by the determination means within a predetermined time period after the completion of moving of the information processing device, the control means may prohibit execution of the predetermined processing.

The calculation means may calculate the vibration information on the basis of the positions and the velocity vectors of feature points in the image acquired by the acquisition means.

The calculation means may calculate the frequency of the vibration, and the determination means may determine that the vibration is a vibration for a vibration command when the frequency is greater than or equal to a threshold.

The acquisition means may further acquire a gesture performed by a user, and when the determination means determines that a vibration for the vibration command has not been generated, the control means does not execute the predetermined processing but may execute processing corresponding to the gesture, and when the determination means determines that a vibration for the vibration command has been generated, the control means may invalidate the gesture.

The determination means may determine that a vibration for the vibration command has been generated when the ratio of the number of feature points having the velocity vectors of the same direction is greater than or equal to a threshold.

An information processing method of another embodiment of the present invention includes the steps of capturing of an image of an object, acquiring of the image captured by processing of the capturing step, calculating of vibration information on the basis of the image acquired by processing of the acquiring step, determining of a vibration command on the basis of the vibration information calculated by processing of the calculating step, and controlling to execute predetermined processing on the basis of the vibration command determined by processing of the determining step.

A program of still another embodiment of the present invention causes a computer to execute the steps of acquiring of an image captured by capture means, calculating of vibration information on the basis of the image acquired by processing of the acquiring step, determining of a vibration command on the basis of the vibration information calculated by processing of the calculating step, and controlling to execute predetermined processing on the basis of the vibration command determined by processing of the determining step.

In an embodiment of the present invention, an image of an object is captured, the captured image is acquired, vibration information is calculated on the basis of the acquired image, a vibration command is determined on the basis of the calculated vibration information, and predetermined processing is carried out on the basis of the determined vibration command.

According to the present invention, it is possible to input commands easily and securely.

DESCRIPTION OF THE PREFERRED EMBODIMENTS

Figure 1:
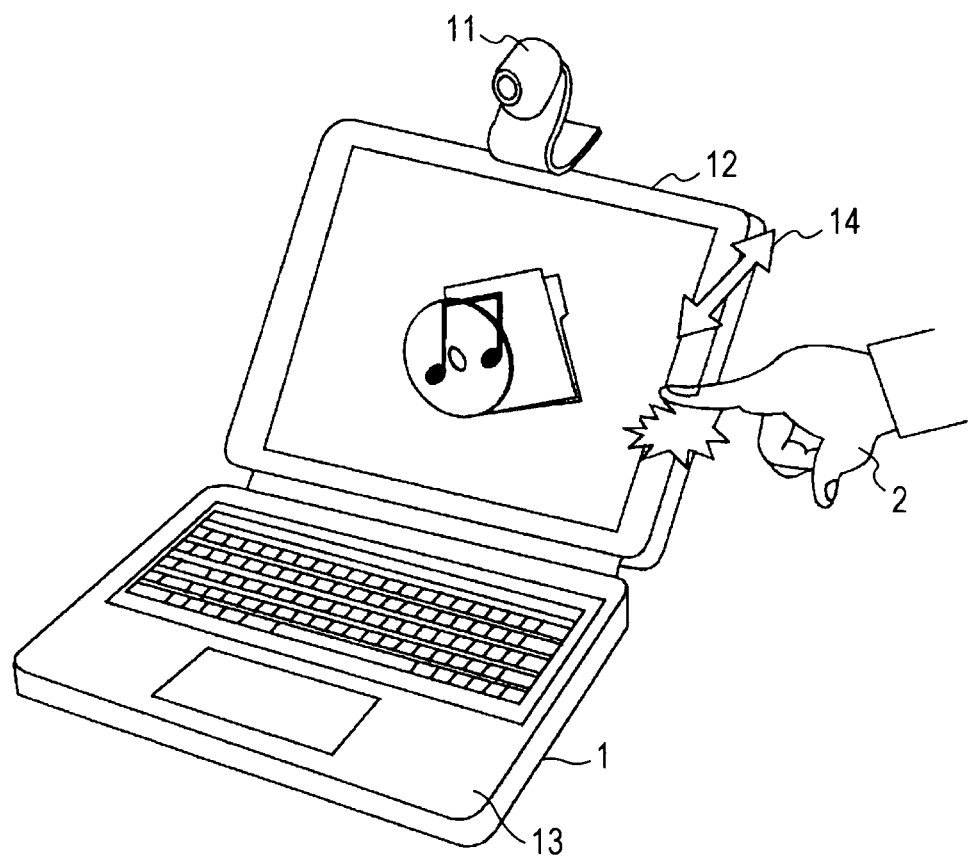
FIG. 1 is a configuration diagram illustrating the appearance of a personal computer.

FIG. 1 shows an example configuration, as an embodiment, of a personal computer 1 to which an embodiment of the present invention is applied.

The laptop personal computer 1 in FIG. 1 is constituted by a main body 13 and a display 12 equipped with a camera 11. The display 12 can be opened or closed with respect to the main body 13.

The camera 11, which is capture means configured to capture an image of an object, is formed of a monocular camera, a stereo camera, an infrared camera, a video camera or the like, and captures a still image or a moving image of a user as an object of shooting.

The personal computer 1 acquires an image captured by the camera 11 and calculates, as vibration information, a vibration generated by tapping the personal computer 1 equipped with the camera 11 by a hand 2 of the user.

Then, on the basis of the calculated vibration information, a vibration command which is input by tapping the personal computer 1 is recognized, and predetermined processing corresponding to the recognized vibration command is carried out.

Therefore, the user can control operation of the personal computer 1 by tapping any place of the personal computer 1 equipped with the camera 11.

[Configuration of Personal Computer]

Figure 2:
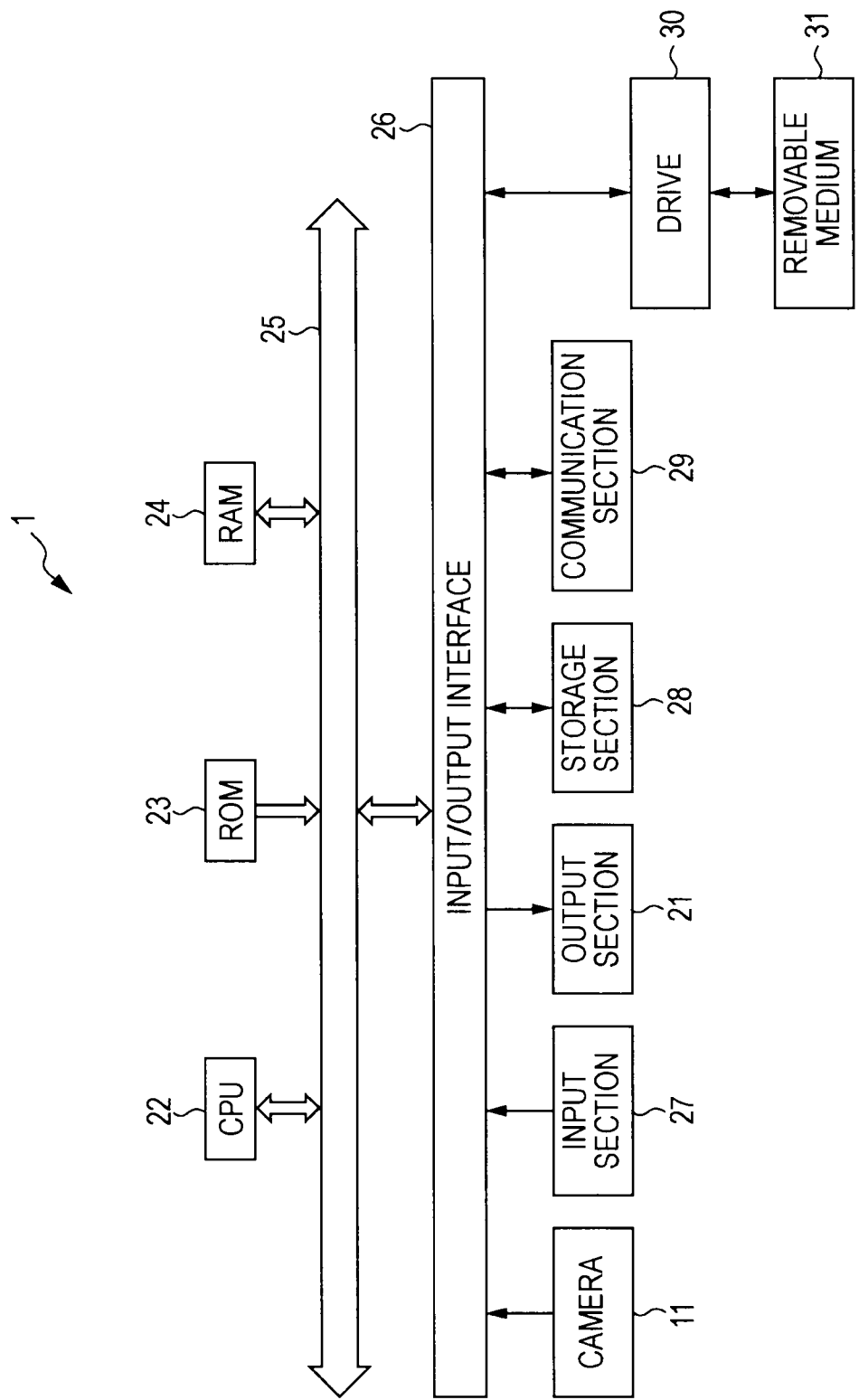
FIG. 2 is a block diagram illustrating an example of a hardware configuration of the personal computer to which an embodiment of the present invention is applied.

FIG. 2 shows a block diagram illustrating an example of a hardware configuration of the personal computer 1.

In the personal computer 1, a CPU 22, a Read Only Memory (ROM) 23 and a Random Access Memory (RAM) 24 are connected to one another via a bus 25. In addition, an input/output interface 26 is connected to the bus 25. To the input/output interface 26, the camera 11, an input section 27 formed of a keyboard, a touch panel, a touch pad, a pen device, a mouse, a microphone or the like, an output section 21 formed of the display 12, a speaker (not shown) or the like, and a storage section 28 formed of a hard desk, a nonvolatile memory or the like are connected. In addition, to the input/output interface 26, a communication section 29 formed of a network interface or the like, and a drive 30 that drives a removable medium 31 such as a magnetic disk, an optical disk, a magneto-optical disk or a semiconductor memory are connected.

In the personal computer 1 configured as above, the aforementioned series of processing is carried out when the CPU 22 loads a program stored in the storage section 28, for example, into the RAM 24 via the input/output interface 26 and the bus 25, and executes the program. A program to be executed by the CPU 22 is provided in such a manner that the program is stored in the removable medium 31, which is a package medium. As the package medium, a magnetic disk (including a flexible disk), an optical disk (Compact Disc-Read Only Memory (CD-ROM), Digital Versatile Disc (DVD), etc.), a magneto-optical disk or a semiconductor memory is used. Alternatively, the program may be provided via a wired or wireless transmission medium such as a local network, the Internet or digital satellite broadcasting. The program can be installed in the storage section 28 via the input/output interface 26 by mounting the removable medium 31 in the drive 30. Alternatively, the program may be installed in the storage section 28 by receiving the program by using the communication section 29 via the wired or wireless transmission medium. In addition, the program may be installed in advance in the ROM 23 or the storage section 28.

Note that the program to be executed by the personal computer 1 may be a program in which processing is carried out in chronological order in the order described in the present specification, or a program in which processing is carried out in parallel or at a necessary timing, such as when the program is called.

Figure 3:
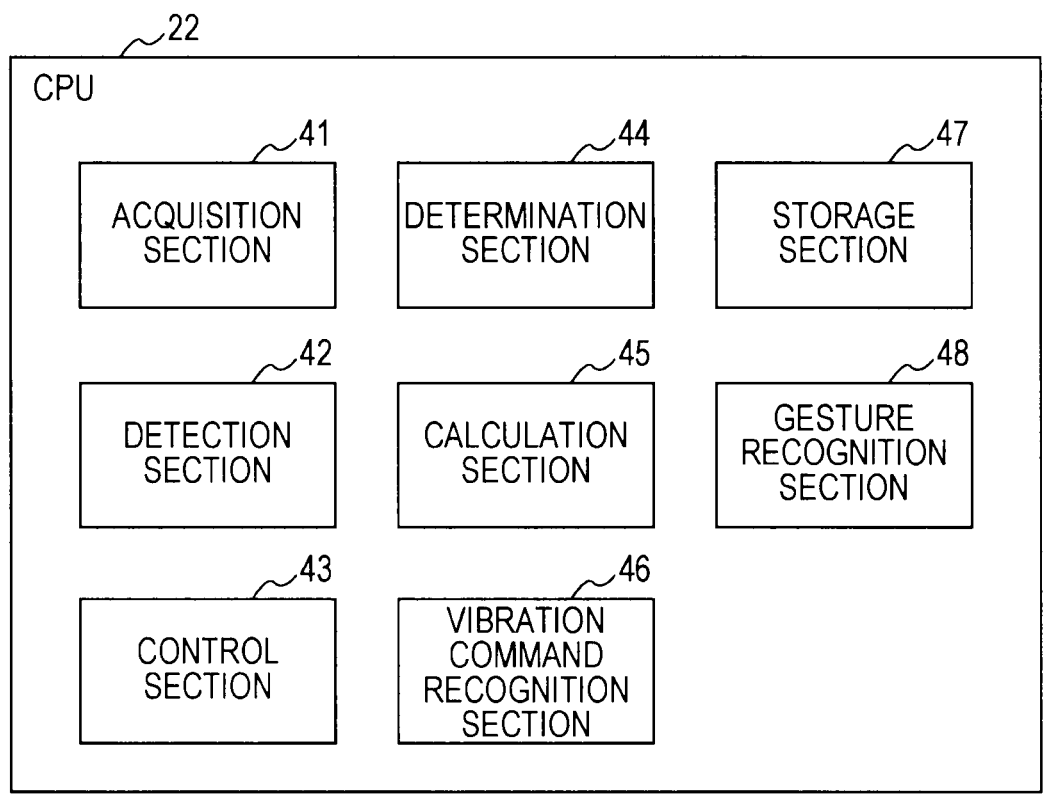
FIG. 3 is a block diagram illustrating an example of a functional configuration of the CPU.

FIG. 3 shows a block diagram illustrating an example of a functional configuration of the CPU 22.

The CPU 22 is constituted by an acquisition section 41, a detection section 42, a control section 43, a determination section 44, a calculation section 45, a vibration command recognition section 46, a storage section 47 and a gesture recognition section 48. Note that each block of the CPU 22 can send and receive a signal to and from one another as necessary.

In the CPU 22, the acquisition section 41, which is acquisition means, acquires various pieces of information. The detection section 42 detects information for detecting a vibration from an image captured by the camera 11. The control section 43, which is control means, controls various processing tasks. The determination section 44, which is determination means, determines whether or not processing meets a predetermined condition. The calculation section 45, which is calculation means, calculates vibration information or the like. The vibration command recognition section 46 recognizes a command by using the vibration provided to the personal computer 1. The storage section 47 stores predetermined information in the RAM 24 or the storage section 28. The gesture recognition section 48 recognizes a gesture. The gesture is an operation performed by the hand 2 of the user by moving in three-dimensional space or forming a predetermined shape.

[Vibration Command Recognition Processing]

Figure 4:
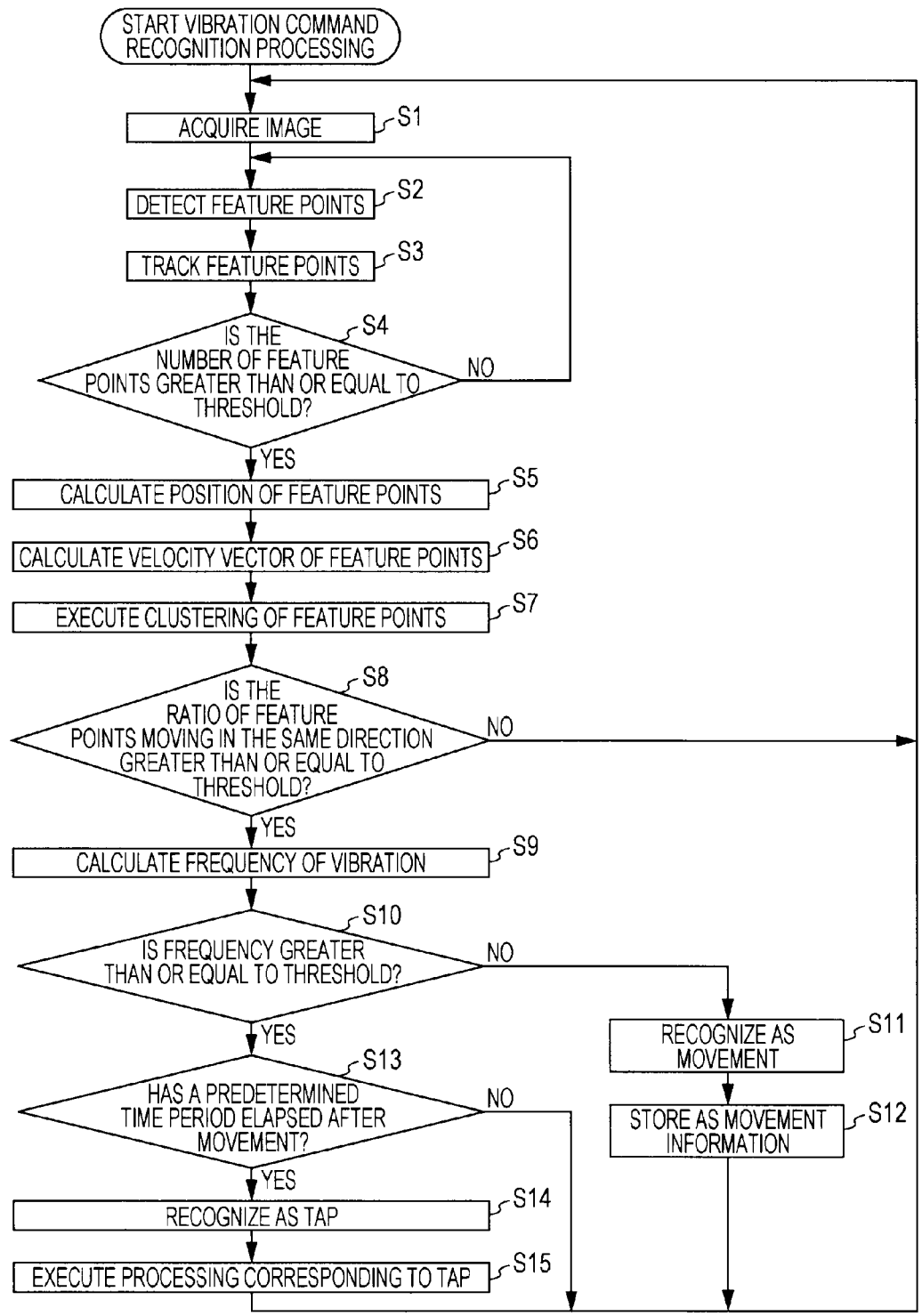
FIG. 4 is a flowchart illustrating vibration command recognition processing.

FIG. 4 shows a flowchart illustrating vibration command recognition processing in which a tapping operation performed by the user is recognized as a vibration command. The vibration recognition processing is carried out when the user provides an instruction to activate the camera 11 and an application that recognizes vibration commands.

In step S1, the acquisition section 41 acquires an image captured by the camera 11. The image acquired from the camera 11 may be a captured image itself or an image which has been edited such as a gray image.

In step S2, the detection section 42 detects multiple feature points from the acquired image. A feature point is a point, in the image, where the color (or the brightness value) thereof changes significantly in both the vertical direction and the lateral direction. That is, predetermined plural pixels are randomly selected from among pixels having a large change in the pixel value in such a manner that the selected pixels are evenly dispersed throughout the image.

In step S3, the control section 43 tracks the detected feature points. That is, in the tracking of the feature points, matching processing or processing for calculating the difference is carried out with respect to two images (for example, the current frame image and the preceding frame image) from which the feature points are detected, and pixels having the same value are tracked as the same feature point.

Figure 5:
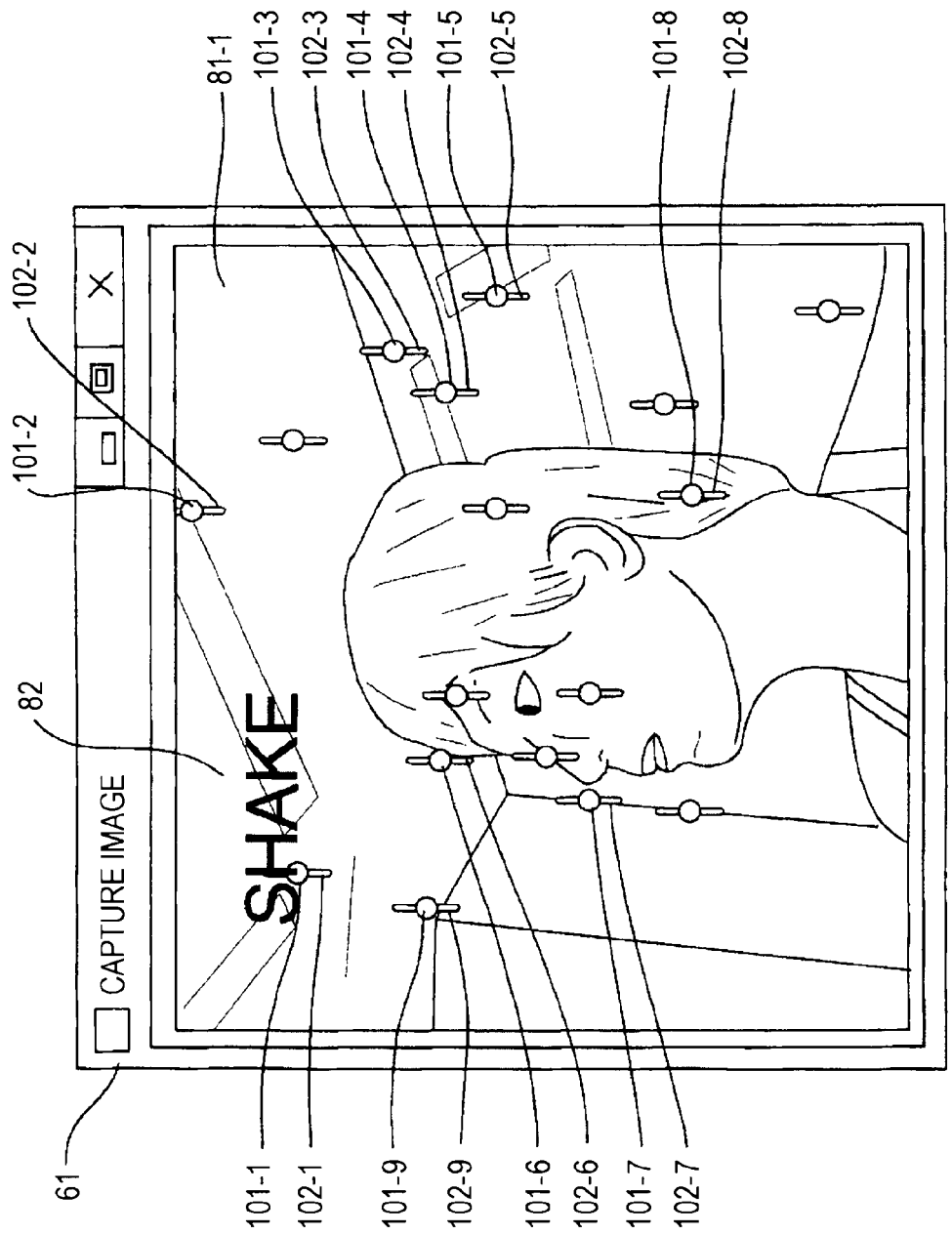
FIG. 5 is a diagram illustrating a display example of an image when the personal computer is tapped.

An example of displaying feature points in an image when the personal computer 1 is tapped is shown in FIG. 5. FIG. 5 shows a diagram illustrating a display example of an image captured by the camera 11 when the personal computer 1 equipped with the camera 11 is tapped.

In a display window 61, a mirror image 81-1 having a mirror-reversed image of an image captured by the camera 11, a recognition result 82, feature points 101-1 to 101-9 and paths 102-1 to 102-9 of the feature points 101-1 to 101-9 are displayed.

Note that, for simplicity, symbols only denote main feature points and paths. In addition, the feature points 101-1 to 101-9 and the paths 102-1 to 102-9 may be hereinafter collectively referred to as feature points 101 and paths 102, respectively.

The display window 61 in the example of FIG. 5 displays the user and the background image as the image 81-1. When the processing of detecting feature points in step S2 and the processing of tracking the feature points in step S3 are carried out, the feature points 101 and the paths 102 are displayed on the image 81-1.

With reference to FIG. 5, the feature points 101-1 to 101-9 and the corresponding paths 102-1 to 102-9 are briefly explained.

In the example of FIG. 5, the feature points 101-1 to 101-5 on boundaries in the background image, for example, on boundaries between the ceiling and fluorescent lights, and the feature points 101-6 to 101-8 on a boundary between the user and the background image are used as the feature points. In addition, the paths 102-1 to 102-8 respectively corresponding to the feature points 101-1 to 101-8 are displayed.

For example, when the user moves, the feature points 101-6 to 101-8 on the boundary between the user and the background image move and the corresponding paths 102-6 to 102-8 are displayed.

On the other hand, when the display 12 of the personal computer 1 is tapped by the user, since the display 12 can be opened or closed with respect to the main body 13, the display 12 vibrates in the front-back direction with the connection section with the main body 13 as the center, as indicated by an arrow 14 in FIG. 1. Consequently, the capturing position of the camera 11 equipped in the upper portion of the display 12 vibrates in the vertical direction.

Note that, it is preferable that tracking is performed with respect to the feature points 101 which are evenly disposed throughout the image. Therefore, it is preferable that any of the feature points 101 that are located close to one another, such as the feature points 101-3 to 101-5, for example, be deleted, and tracking be performed for the feature points 101 that are located sufficiently apart from others, such as the feature point 101-9, for example.

Next, the relationship between the feature points and the paths when the display 12 is tapped is explained with reference to FIGS. 6, 7A, 7B and 7C.

Figure 6:
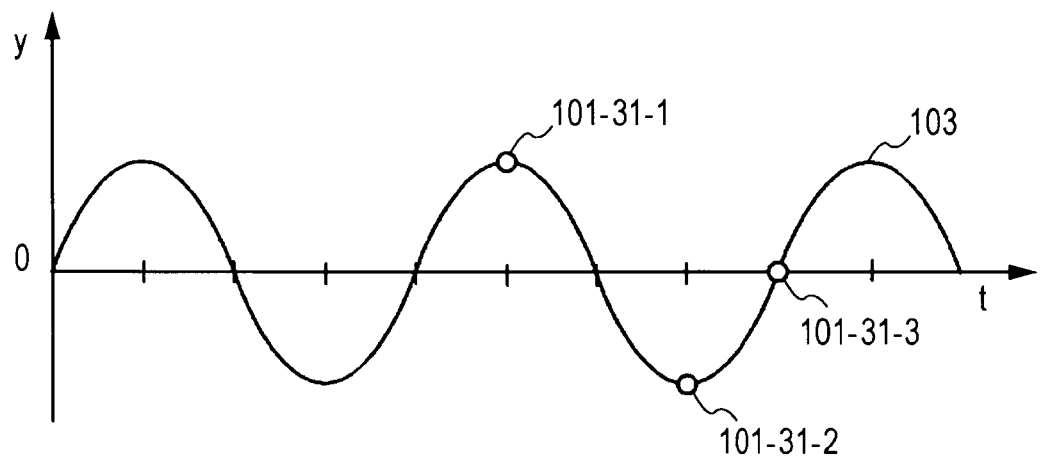
FIG. 6 is a diagram illustrating the relationship between a feature point and a path thereof.

FIG. 6 shows a two-dimensional graph illustrating changes in the position of a feature point 101. In FIG. 6, the horizontal axis indicates time t and the vertical axis indicates y coordinates in the vertical direction of the screen. In the y coordinates, zero indicates the position where the feature point remains still.

When the display 12 is tapped, the camera 11 vibrates vertically, and the vibration gradually decreases and finally stops. Therefore, since the position of the feature point 101 changes vertically with reference to a y coordinate zero, a signal 103 corresponding to the path 102 obtained by deploying the motion with respect to the time axis is a sinusoidal signal, as shown in FIG. 6. The amplitude thereof gradually decreases and finally becomes zero.

Figure 7A:
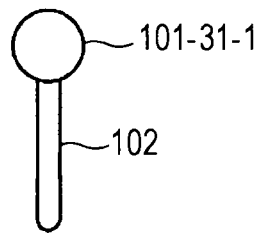
FIGS. 7A, 7B and 7C are diagrams illustrating display examples of the feature point and the path thereof.
Figure 7B:
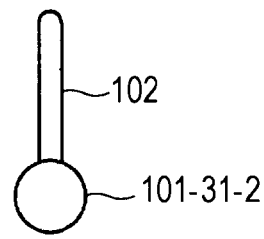
Figure 7C:
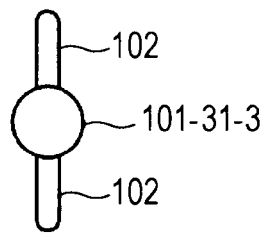

FIGS. 7A, 7B and 7C show a typical example of displaying one of the feature points 101 and the path 102 thereof on the display window 61 of FIG. 5 when the display 12 is tapped.

Since the y coordinate of the feature point 101 periodically changes as shown in FIG. 6, when the feature point 101 is located at the position of the feature point 101-31-1 (that is, the peak value on the positive side of the y coordinates) in FIG. 6, the feature point 101 is located at the upper end portion of the path 102, as shown in FIG. 7A.

When the feature point 101 is located at the position of the feature point 101-31-2 (that is, the peak value on the negative side of the y coordinates) in FIG. 6, the feature point 101 is located at the lower end portion of the path 102, as shown in FIG. 7B.

When the feature point 101 is located at the position of the feature point 101-31-3 (that is, zero position of the y coordinate) in FIG. 6, the feature point 101 is located at the middle portion of the path 102, as shown in FIG. 7C.

Since the feature point 101 and the path 102 are displayed as in FIGS. 7A to 7C, the user can determine which direction the feature point 101 displayed in the display window 61 is moving.

Now back to FIG. 4. After the feature point tracking processing in step S3, the determination section 44 determines whether the number of feature points is greater than or equal to a threshold in step S4. That is, it is determined whether the number of feature points is sufficient for calculating vibration information. The vibration information is, for example, the frequency of a vibration.

In step S4, if it is determined that the number of feature points is smaller than a predetermined threshold, that is, if it is determined that a sufficient number of feature points for calculating the vibration information do not exist, the flow returns to step S2 and the same processing is repeated. That is, a new feature point is detected.

In step S4, if it is determined that the number of feature points is greater than or equal to the predetermined threshold, that is, if it is determined that a sufficient number of feature points for calculating the vibration information exist, the calculation section 45 calculates positions of the feature points in step S5.

That is, in the example of FIG. 5, the x and y coordinates of each of the feature points 101 on the image 81-1 are calculated.

In step S6, the calculation section 45 calculates velocity vectors of the multiple feature points. The velocity vector can be calculated by, for example, dividing the difference between the position of the feature point 101-51 in the current frame and the position thereof in the preceding frame by the time of one frame.

In step S7, the control section 43 executes clustering of the feature points on the basis of the calculated velocity vectors. The clustering is processing for partitioning data set into subsets, called clusters.

By classifying feature points having the calculated velocity vector pointing in the same direction into the same cluster, feature points that move in a similar way are classified into one group. For the clustering, a method of calculating one-dimensional histogram of an angle or an existing clustering method, such as k-means, may be used.

For example, in the display example of FIG. 5, when the user moves, the feature points 101-6, 101-8 and 101-9 located on the face of the user move in substantially the same direction. As a result, the clustering processing classifies these feature points 101-6, 101-8 and 101-9 into one subset. On the other hand, the feature points 101-1 to 101-5 and 101-7 located on the background image do not move.

Meanwhile, when the display 12 is tapped, the whole screen image including the face of the user and background image vibrates, whereby almost all feature points including the feature points 101-1 to 101-9 move in the same direction (that is, in an upward or downward direction). Therefore, many feature points including the feature points 101-1 to 101-9 are classified into one subset.

Then, in step S8, the determination section 44 determines whether or not the ratio of the feature points moving in the same direction to all the feature points is greater than or equal to a threshold. Thus, this determines whether the personal computer 1 equipped with the camera 11 vibrates or not.

Note that, depending on a method of supporting the display 12 with respect to the main body 13, the display 12 may rotate when the display 12 is tapped. In the processing in step S8, it is difficult to detect the rotational movement of the camera 11 around the central axis by using the method that determines whether the ratio of the feature points moving in the same direction is greater than or equal to a predetermined threshold.

In such a case, the rotational movement of the display 12 can be detected by calculating the outer product of the path of each feature point with the center of an image acquired from the camera 11 as the origin.

In step S8, when it is determined that the ratio of the feature points moving in the same direction is smaller than the predetermined threshold, that is when it is determined that the display 12 equipped with the camera 11 is not vibrating, a tapping operation has not been performed by the user, and the flow returns to step S1, and the subsequent processing is repeated.

In step S8, when it is determined that the ratio of the feature points moving in the same direction is greater than or equal to the predetermined threshold, that is, when it is determined that the display 12 equipped with the camera 11 is vibrating, the calculation section 45 calculates the frequency of vertical direction vibrations as vibration information in step S9.

The vibration frequency is calculated from the number of vibrations per unit time, which is calculated on the basis of the position of the feature point. Specifically, the frequency of the signal in FIG. 6 is calculated.

The reason why the frequency of vertical direction vibrations is calculated is that since the display 12 is rotatably supported with respect to the main body 13 in the laptop personal computer 1 shown in FIG. 1, vibrations are produced in a vertical direction.

Therefore, the vibration direction to be calculated may be changed depending on the type of device to be vibrated.

In step S10, the determination section 44 determines whether or not the calculated frequency is greater than or equal to a threshold. For example, when the user holds and moves the entire body of the personal computer 1, many feature points move in the same direction.

However, since the movement of the feature points in such a case is slower than that in the case where the display 12 is tapped, the frequency is low. Therefore, the frequency is compared with a predetermined threshold to determine whether or not the type of vibration is vibration caused by tapping.

When it is determined that the frequency calculated in step S10 is smaller than the predetermined threshold, that is, when it is determined that the type of vibration is vibration other than vibration caused by tapping, the vibration command recognition section 46 recognizes the type of vibration as moving of the personal computer 1 in step S11.

Figure 8:
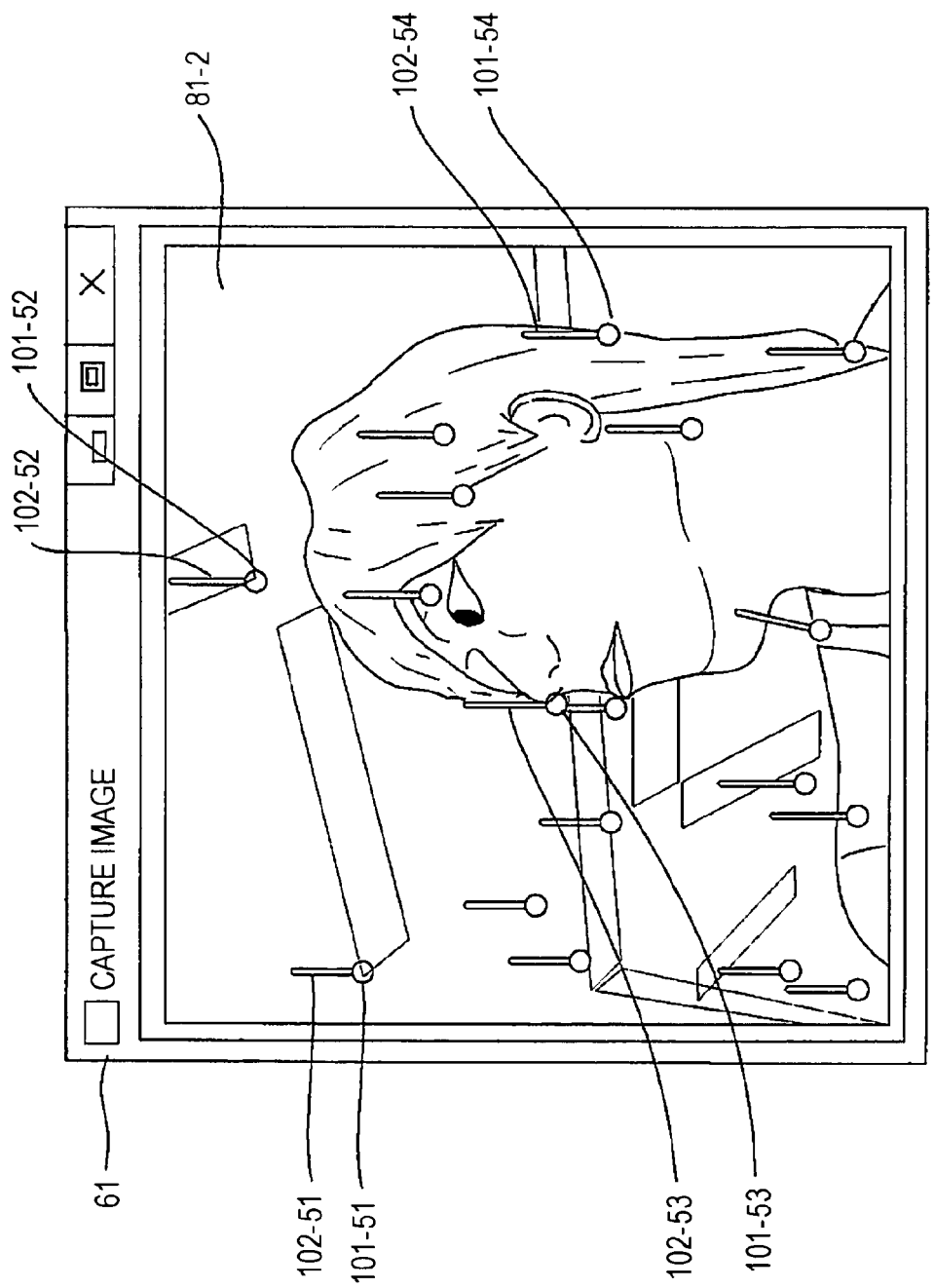
FIG. 8 is a diagram illustrating a display example of an image when the personal computer is moved.

A display example of the feature points and the paths thereof in an image when the type of vibration is recognized as moving of the personal computer 1 is shown in FIG. 8.

FIG. 8 shows a diagram illustrating an example of display of an image to be displayed when the type of vibration of the personal computer 1 equipped with the camera 11 is recognized as moving of the personal computer 1.

The display window 61 of the example of FIG. 8 displays an image 81-2 acquired from the camera 11, and feature points 101 and paths 102 thereof. In the example of FIG. 8, the shapes of all feature points including the feature points 101-51 to 101-54 and all paths including the paths 102-51 to 102-54 corresponding to the feature points 101-51 to 101-54 are the same.

That is, as shown in FIG. 7B, the paths 102 are shown on the upper side of the feature points 101. Thus, the personal computer 1 equipped with the camera 11 is moved in an upward direction.

Now back to FIG. 4. In step S12, the storage section 47 stores movement information. The movement information is information such as time when the type of vibration is recognized as moving of the personal computer 1.

That is, as the movement information, the time when the moving of the personal computer 1 equipped with the camera 11 is finally completed, which is obtained by repeating the processing in step S1 to step S12, is stored.

In step S10, when it is determined that the calculated frequency is greater than or equal to the predetermined threshold, the vibration is considered to be a vibration caused by the user tapping on the display 12. That is, there is a possibility that a vibration command has been input by the user.

In such a case, in step S13, the determination section 44 determines whether a predetermined time period has elapsed since the completion of the moving of the personal computer 1. That is, it is determined whether or not the predetermined time period has elapsed since the time stored in the movement information.

In step S13, when it is determined that the predetermined time period has not yet elapsed since the completion of the moving of the personal computer 1, that is when the predetermined time period has not yet elapsed since the time stored in the movement information, the flow returns to step S1.

This prohibits the execution of processing of recognizing tapping and processing corresponding thereto in steps S14 and S15.

That is, for example, immediately after the laptop personal computer 1 having the display 12 equipped with the camera 11 is placed on a table, the display 12 will vibrate for a while.

In addition, immediately after the display 12 of the laptop personal computer 1 being in a closed state is opened, the display 12 will vibrate for a while.

These vibrations are the same as the vibration caused by the user by tapping on the display 12, and thus are potential vibration commands. However, no vibration command has actually been input by the user.

Therefore, these vibrations are prevented from being falsely recognized as a vibration caused by tapping, that is, a vibration for a vibration command.

In step S13, when it is determined that the predetermined time period has elapsed since the completion of the moving of the personal computer 1, that is when the predetermined time period has elapsed since the time stored in the movement information, the vibration command recognition section 46 recognizes the type of vibration command as tapping in step S14.

That is, it is recognized that the vibration command is input by the user by actively applying vibrations.

In other words, when the camera 11 captures an image, for example, it is preferable that no vibration is applied to the camera 11 since vibrations to the camera 11 cause image blurring. The vibrations in this case are noise.

On the other hand, vibrations caused by tapping are not vibrations due to noise, but are vibrations due to signals which are purposefully provided by the user to perform a predetermined input.

In step S15, the control section 43 executes processing corresponding to tapping. The processing corresponding to tapping is processing that is carried out in accordance with a vibration command input by tapping.

For example, in an operation of a music player application, the control section 43 switches between playing and stopping of the music by the music player every time a vibration command input by tapping is recognized.

And of course, in addition to this, vibration commands may be assigned for turning on and off of the power of the personal computer 1.

In addition, the control section 43 displays "SHAKE", which is a recognition result 82, in the display window 61, as shown in FIG. 5. This means the vibration command input by tapping is recognized. When the display window 61 is not displayed on the display 12, the recognition result 82 may be displayed at any place on the display.

After the processing in step S15, the flow returns to step S1, and the same processing is repeated.

In this way, the personal computer 1 equipped with the camera 11 can recognize a vibration command, which has been input by the user by tapping the display 12, by using only the camera 11.

The user can tap any place, of course, and the place is not limited to the display 12.

Note that, in the example of FIG. 4, although the vibration information of the personal computer 1 is calculated on the basis of the feature points, a method for calculating the vibration information is not limited thereto. The vibration information may be calculated on the basis of the optical flow of the entire acquired image by using, for example, a block matching method.

[Gesture Recognition Processing]

Figure 9:
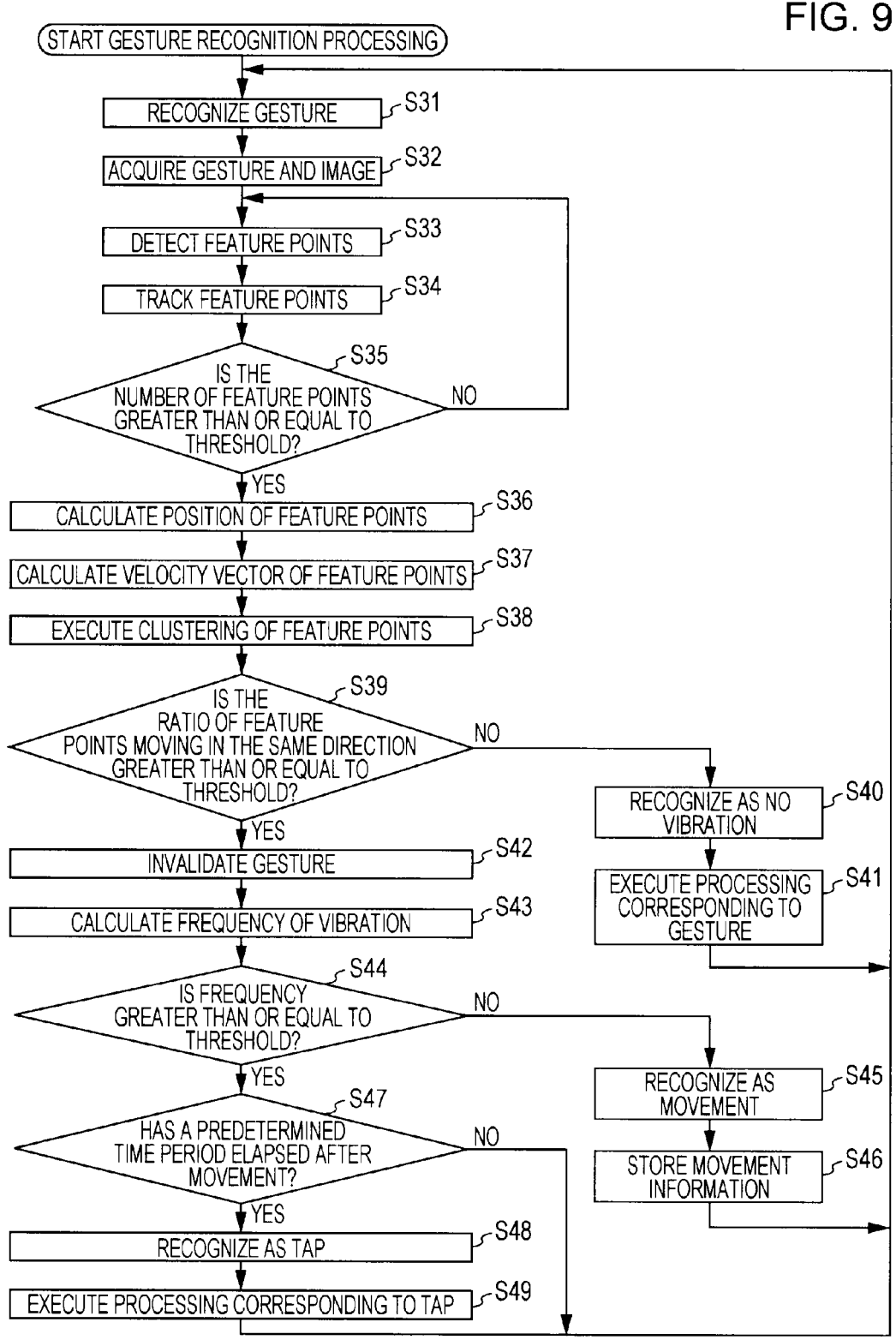
FIG. 9 is a flowchart illustrating gesture recognition processing.

The vibration recognition processing in FIG. 4 can be applied to a case where a command is input by means of a gesture. FIG. 9 shows a flowchart illustrating gesture recognition processing for this case.

In FIG. 9, the processing in steps S33 to S39 and S43 to S49 are the same as that in steps S1 to S15 in FIG. 4. Therefore, a detailed explanation of the processing is not repeated and is omitted.

In step S31, the gesture recognition section 48 recognizes a gesture. The gesture is an operation performed by the hand by moving in three-dimensional space or forming a predetermined shape in order to input a predetermined command by the user.

Recognition of a gesture is carried out as described below, for example. That is, the difference between the images of two sequential frames is calculated to detect the region of a moving hand. Then, the center of gravity of the area of the hand is determined. By comparing the center of gravity of the path with basic gesture patterns prepared in advance, it is recognized that a gesture that is closest to a basic gesture pattern has been input.

In step S32, the acquisition section 41 acquires a recognized gesture and an image captured by the camera 11.

In step S33, the detection section 42 detects feature points. In step S34, the control section 43 tracks the feature points.

In step S35, the determination section 44 determines whether the number of feature points is greater than or equal to a threshold. If it is determined that the number of feature points is smaller than the threshold, the flow returns to step S33, and the subsequent processing is repeated. If it is determined that the number of feature points is greater than or equal to the threshold, the calculation section 45 calculates the positions of the feature points in step S36.

In step S37, the calculation section 45 calculates the velocity vectors of the feature points. In step S38, the control section 43 executes clustering of the feature points.

In step S39, the determination section 44 determines whether the ratio of the feature points moving in the same direction is greater than or equal to a threshold. If it is determined that the ratio of the feature points moving in the same direction is smaller than the threshold, the vibration command recognition section 46 recognizes in step S40 that no vibration has been generated. That is, it is recognized that a vibration for a vibration command has not been generated.

In step S41, the control section 43 executes processing corresponding to the gesture. Therefore, in a music player, for example, processing such as fast-forward, fast-rewind or pause is carried out in accordance with the movement of a hand performed by the user in front of the camera 11.

On the other hand, in step S39, if it is determined that the ratio of the feature points moving in the same direction is greater than or equal to the threshold, the control section 43 invalidates the gesture in step S42. That is, the control section 43 prohibits the execution of processing corresponding to the gesture recognized in step S31.

In step S43, the calculation section 45 calculates the frequency of the vibration. In step S44, the determination section 44 determines whether the frequency is greater than or equal to a threshold. If it is determined that the frequency is smaller than the threshold in step S44, the vibration command recognition section 46 recognizes the vibration as moving of the personal computer 1 in step S45. In step S46, the storage section 47 stores the movement information.

If it is determined that the frequency is greater than or equal to the threshold in step S44, the determination section 44 determines in step S47 whether a predetermined time period has elapsed since the completion of the moving of the personal computer 1.

If it is determined that the predetermined time period has elapsed since the completion of the moving of the personal computer 1 in step S47, the vibration command recognition section 46 recognizes the vibration as tapping in step S48. In step S49, the control section 43 executes processing corresponding to tapping.

After the processing in steps S41, S46 or S49, or if it is determined that the predetermined time period has not elapsed since the completion of the moving of the personal computer 1 in step S47, the flow returns to step S1 and the same processing is repeated.

In this way, while the display 12 equipped with the camera 11 is vibrating, the control section 43 prohibits the execution of processing corresponding to a gesture. This prevents an unintended gesture of the user from being falsely recognized.

In the present specification, an example of recognizing a vibration command caused by tapping by using the laptop personal computer 1 equipped with the camera 11 is explained. However, the device to be tapped is not limited to the personal computer 1.

For example, a television receiver or a monitor equipped with a camera may be tapped to perform an operation of turning on and off of the power.

In addition, for stationary devices such as a television receiver and a monitor, the processing for recognizing the moving thereof may not be carried out.

The present application contains subject matter related to that disclosed in Japanese Priority Patent Application JP 2010-049477 filed in the Japan Patent Office on Mar. 5, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
    circuitry configured to
        recognize a gesture performed by a user as a gesture command, the gesture command corresponding to a first function,
        acquire an image of an object,
        calculate vibration information indicative of a vibration of the information processing device, as a result of a user tap input, on the basis of the acquired image,
        determine whether a vibration event occurred based on the calculated vibration information,
        when it is determined that the vibration event occurred, invalidate the gesture command and determine whether the vibration event includes a vibration command corresponding to a second function,
        when it is determined that the vibration event did not occur, execute the first function,
        when it is determined that the vibration event includes the vibration command and the vibration command is generated more than a predetermined time period after a latest recorded movement of the information processing device, execute the second function, and
        when it is determined that the vibration event does not include the vibration command, store the vibration event as a new recorded movement of the information processing device.

2. The information processing device according to claim 1, wherein, when determining whether the vibration event includes the vibration command, the circuitry is further configured to
    determine whether a quantity of discrete feature points in the acquired image is a value greater than or equal to a first threshold, the first threshold corresponding to a quantity of discrete feature points sufficient for calculating a frequency of the vibration information;
    when the quantity of discrete feature points in the acquired image is a value greater than or equal to the first threshold,
        calculate the frequency of the vibration information;
        determine that the vibration event includes the vibration command when the frequency is greater than or equal to a second threshold; and
        determine that the vibration event does not include the vibration command when the frequency is less than the second threshold; and
    when the quantity of discrete feature points in the acquired image is not a value greater than or equal to the first threshold, detect a new feature point.

3. The information processing device according to claim 2, wherein the circuitry is configured to prohibit execution of the second function when the frequency is less than the second threshold.

4. The information processing device according to claim 2, wherein the circuitry is configured to determine that the vibration event includes the vibration command when a ratio of a number of feature points having velocity vectors of the same direction is greater than or equal to a third threshold.

5. The information processing device according to claim 2, wherein, when the quantity of discrete feature points in the acquired image is greater than or equal to the first threshold, the circuitry is configured to calculate the vibration information on the basis of positions and velocity vectors of the feature points in the acquired image.

6. The information processing apparatus according to claim 2, wherein the circuitry is configured to cluster the feature points based upon velocity vectors of the feature points.

7. The information processing apparatus according to claim 2, wherein, in calculating the vibration information based upon the feature points in the acquired image, the circuitry is configured to ignore feature points that are located close to one another.

8. The information processing device according to claim 2, wherein the circuitry is configured to calculate the vibration information on the basis of positions and velocity vectors of the feature points in the acquired image.

9. The information procession apparatus according to claim 2, wherein the circuitry is configured to cluster feature points whose velocity vectors point in the same direction into the same cluster.

10. The information processing apparatus according to claim 9, wherein the circuitry is configured to determine that the vibration event includes the vibration command when a ratio of feature points of the same cluster with respect to all the feature points is greater than or equal to a third threshold.

11. An information processing method comprising:
    recognizing a gesture performed by a user as a gesture command, the gesture command corresponding to a first function;
    acquiring an image of an object;
    calculating, by the circuitry, vibration information indicative of a vibration of an information processing device, as a result of a user tap input, on the basis of the acquired image;
    determining whether a vibration event occurred based on the calculated vibration information;
    when it is determined that the vibration event occurred, invalidating the gesture command and determining whether the vibration event includes a vibration command corresponding to a second function;
    when it is determined that the vibration event did not occur, executing the first function by the information processing device;
    when it is determined that the vibration event includes the vibration command and the vibration command is generated more than a predetermined time period after a latest recorded movement of the information processing device, executing the second function; and
    when it is determined that the vibration event does not include the vibration command, storing the vibration event as a new recorded movement of the information processing device.

12. The information processing method according to claim 11, wherein determining whether the vibration event includes the vibration command comprises:

determining whether a quantity of discrete feature points in the acquired image is a value greater than or equal to a first threshold, the first threshold corresponding to a quantity of discrete feature points sufficient for calculating a frequency of the vibration information;

when the quantity of discrete feature points in the acquired image is a value greater than or equal to the first threshold,
  calculating the frequency of the vibration information;
  determining that the vibration event includes the vibration command when the frequency is greater than or equal to a second threshold; and
  determining that the vibration event does not include the vibration command when the frequency is less than the second threshold; and when the quantity of discrete feature points in the acquired image is not a value greater than or equal to the first threshold, detecting a new feature point.

13. A non-transitory computer readable medium storing a program configured to cause a processor of an information processing device to perform a method comprising:

recognizing a gesture performed by a user as a gesture command, the gesture command corresponding to a first function;

acquiring an image of an object;

calculating vibration information indicative of a vibration of the information processing device, as a result of a user tap input, on the basis of the acquired image;

determining whether a vibration event occurred based on the calculated vibration information;

when it is determined that the vibration event occurred, invalidating the gesture command and determining whether the vibration event includes a vibration command corresponding to a second function;

when it is determined that the vibration event did not occur, executing the first function by the information processing device;

when it is determined that the vibration event includes the vibration command and the vibration command is generated more than a predetermined time period after a latest recorded movement of the information processing device, executing the second function; and when it is determined that the vibration event does not include the vibration command, storing the vibration event as a new recorded movement of the information processing device.

14. The non-transitory computer readable medium according to claim 13, wherein determining whether the vibration event includes the vibration command comprises:

determining whether a quantity of discrete feature points in the acquired image is a value greater than or equal to a first threshold, the first threshold corresponding to a quantity of discrete feature points sufficient for calculating a frequency of the vibration information;

when the quantity of discrete feature points in the acquired image is a value greater than or equal to the first threshold,
  calculating the frequency of the vibration information;
  determining that the vibration event includes the vibration command when the frequency is greater than or equal to a second threshold; and
  determining that the vibration event does not include the vibration command when the frequency is less than the second threshold; and when the quantity of discrete feature points in the acquired image is not a value greater than or equal to the first threshold, detecting a new feature point.

* * * * *